United States Patent
Bake et al.

[11] Patent Number: 6,016,826
[45] Date of Patent: Jan. 25, 2000

[54] AUTOMATIC CENTER CAVITY EQUALIZING VALVE

[75] Inventors: Earl A. Bake, Cary; Leonard J. Stephens, Raleigh, both of N.C.

[73] Assignee: M&FC Holding Company, Inc., Wilmington, Del.

[21] Appl. No.: 08/533,774

[22] Filed: Sep. 26, 1995

[51] Int. Cl.$^7$ .................................................. F16K 3/16
[52] U.S. Cl. ..................... 137/112; 137/599; 251/175; 251/327
[58] Field of Search .................................. 137/102, 112, 137/113, 599; 251/175, 327

[56] References Cited

U.S. PATENT DOCUMENTS

| | | | |
|---|---|---|---|
| 2,358,228 | 9/1944 | Hoof | 137/113 |
| 2,371,293 | 3/1945 | Hoof | 137/113 X |
| 2,608,986 | 9/1952 | Stephens | 137/102 |
| 3,123,090 | 3/1964 | Bredtschneider | 137/112 |
| 3,130,742 | 4/1964 | Bredtschneider | 251/327 X |
| 3,664,362 | 5/1972 | Weise | 137/102 |

FOREIGN PATENT DOCUMENTS 171049  1/1976  Czech Rep. .

*Primary Examiner*—Stephen M. Hepperle
*Attorney, Agent, or Firm*—Myers Bigel Sibley & Sajovec, P.A.

[57] ABSTRACT

An automatic center cavity equalizing valve for equalizing pressure in a main valve. The equalizing valve includes a body with a bore for providing fluid communication between an upstream port and a center cavity port, and a downstream port and the center cavity port. A metal ball is disposed within the bore and is arranged to mate with upstream and downstream seats to seal communication with the upstream or downstream port and the center cavity port depending upon the differential pressure across valve. The metal ball is spring biased against the downstream seat to prevent damage to the downstream seat due to rattling. In addition, access plugs are provided at opposite ends of the bore to allow for access to the interior of the bore for repairing or replacing the metal ball, the seats, and/or other internal components.

20 Claims, 3 Drawing Sheets

AUTOMATIC CENTER CAVITY EQUALIZING VALVE

FIELD OF THE INVENTION

This invention relates to valves, and is directed more particularly to an automatic center cavity equalizing valve for equalizing pressure in the center cavity of another valve construction.

DESCRIPTION OF THE PRIOR ART

Known plug valves, ball valves, and gate valves usually have two valve seats in series. Two seats in series often provide significant advantages. For example, when a valve is opened, closed, or throttled with a high differential pressure, upstream and downstream ports provide two orifices in series to reduce the pressure drop across each port. Also, when the valve is closed two seats in series may provide a sealing advantage in the event that one of the seats is damaged.

Despite these advantages, however, experience has revealed that pressure can be trapped inside the center cavity of these valves, i.e. between the two valve seats. Since valve actuators, particularly those for gate valves, are normally sized based primarily on downstream loading, trapped pressure in the center cavity can load both seats of the valve thereby exceeding the design limitations of the actuator. When this occurs the actuator may be incapable of opening the valve, i.e. the valve becomes pressure locked. Trapped pressure in the center cavity of these valves may also damage the valves if over-pressurization occurs through heating or freezing of the line fluid.

Initially, in an attempt to eliminate these disadvantages improvements in valve operating procedures were developed. For example, partially opening double seated valves before starting a heat-up of a piping system has been determined to be an effective means for preventing hazardous over pressurization. Although these improvements are effective, they rely on conformance to particular procedures by an operator. Under these procedures, therefore, operator error still results in undesirable pressure trapping within the center cavity.

A second approach to preventing over pressurization has involved drilling a small hole in the upstream side of the closure element of the valve into the center cavity. This change effectively bypasses the upstream seat, assuring that the center cavity pressure is the same as the upstream pressure. While this change may be the simplest one for correction of a field problem or for use of a standard valve out of stock, one disadvantage is that the closure assembly cannot be reversed since placing the closure element with the hole on the downstream side would cause leakage. Reversing the closure assembly, however, is a common method of extending the life of parts after extensive valve maintenance.

In order to provide for reversibility, various attempts have been made to bypass the upstream seat without modifying the closure member or closure assembly. One approach has been to drill a hole in the valve body or seat insert. Another approach has been to provide an external equalizer pipe with a valve (typically a small globe valve) between the upstream port and the center cavity. Although these constructions allow for reversal of the closure member or closure assembly to increase valve life, they do not accommodate a situation in which reverse pressure is presented to the main valve, i.e. pressure from the downstream port. In addition, care must still be taken to ensure that the valve body is installed with the hole or equalizer pipe extending from the upstream port to the center cavity. This is because valves with these features do not offer excellent seat tightness in both directions.

In view of these concerns, the art has turned to center cavity equalizing constructions which generally function by providing some reversible communication between the high pressure upstream side of the valve and the center cavity throughout operation of the valve. One such construction is shown particularly in Czechoslovakian Patent 171049 (hereinafter "the '049 patent").

Referring to FIG. 1, the valve described in the '049 patent is an automatic center cavity equalizing valve 1 having an upstream port 2, a downstream port 3 and a center cavity port 4. The center cavity port is generally located between the upstream and downstream ports. A metal ball 5 is movably fixed within a fluid passage cavity 6 of the valve, and the equalizing valve is mounted in a bypass configuration to a main valve 7 having closure member 8.

When the closure member 8 of the main valve 7 is closed, as shown, the ball 5 is forced by upstream pressure against a downstream seat 9 to prevent passage of fluid, being a gas or liquid, through the downstream port 3. Communication is, however, provided between the upstream side 10 of the main valve 7 and the main valve center cavity 11 through the upstream port 2 and center cavity port 4 of the equalizing valve. In this way the center cavity pressure of the main valve 7 is maintained at the same level as the upstream pressure.

Advantageously, an equalizing valve such as shown in FIG. 1 may be reversed. This is because the upstream pressure will always force the ball 5 against a seat (9 or 12) on the downstream side of the valve thereby blocking passage through the downstream port while at the same time provide fluid communication between the upstream side of the valve and the main valve center cavity 11. Since these valves may be reversed, longer valve life may be achieved.

Despite the many advantages of valves such as shown in FIG. 1, it has been found that during transitional periods in the main valve the metal ball 5 tends to rattle within the chamber 6 against the seats 9,12. For example, significant rattling of the ball member can occur due to vibration during shipment, due to power plant or system vibration without pressure, and/or due to Bernoulli effects in the main valve when the main valve is open and flowing with low differential pressure. Over time, this rattling can significantly damage the seats thus causing leakage through the seat to the downstream port. When this occurs, the only current solution is to replace the entire equalizing valve. This is because such valves are generally of a welded construction with no structural provisions for maintainability. Obviously, replacing the entire valve is a time consuming and expensive task.

Accordingly, there is a need in the art for a center cavity equalizing valve which is reversible, avoids the disadvantages associated with seat damage cause by rattling of a ball member, and is easily maintainable.

OBJECTS OF THE INVENTION

Therefore, an object of the invention is to provide a reversible automatic center cavity equalizing valve having structure for preventing rattling of a ball member against the valve seats.

A further object of the invention is to provide such a valve which is easily maintainable and allows for replacement or repair of internal components.

SUMMARY OF THE INVENTION

With the above and other objects in view, as will hereinafter appear, a feature of the present invention is the provision of an automatic center cavity equalizing valve having a body with a bore therethrough and an upstream port, a downstream port, and a center cavity port. The bore provides fluid communication between the upstream port and the center cavity port, and the downstream port and the center cavity port. A metal ball member is disposed within the bore, and is adapted to engage a downstream seat to thereby seal the downstream port from fluid communication with the center cavity port. Advantageously, a compression spring is fixed within the bore to provide a biasing force against the ball member in the direction of the seat that is normally downstream. This biasing force prevents rattling of the ball member against the seat during transitional periods in the main valve.

The equalizing valve according to the present invention is preferably reversible. Thus, an upstream seat for the ball member is also provided, and the ball member is adapted to engage the upstream seat to thereby seal the upstream port from fluid communication with the center cavity port. With this configuration, the ball member will seal the downstream port or the upstream port depending upon the differential pressure across the valve. At the same time, fluid communication is maintained between the center cavity and the higher pressure side of the valve.

In order to facilitate maintainability, a preferred embodiment of a valve according to the invention includes first and second access plugs for closing opposite ends of the bore. The access plugs are preferably threaded with ACME threads so that the plugs may be easily inserted and removed from the bore to allow access to the internal components of the valve, i.e. the seats, ball member, etc.. In addition, the compression spring is preferably fixed between the first access plug and said ball member. The access plugs are sized differently in order to prevent improper installation, and are sealed to the bore with flexible graphite gasket as are the upstream and downstream seats.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWING

Reference is made to the accompanying drawings in which is shown an illustrative embodiment of the invention, from which its novel features and advantages will be apparent.

In the Drawing.

DETAILED DESCRIPTION OF THE PREFERRED EMBODIMENT

Figure 1:
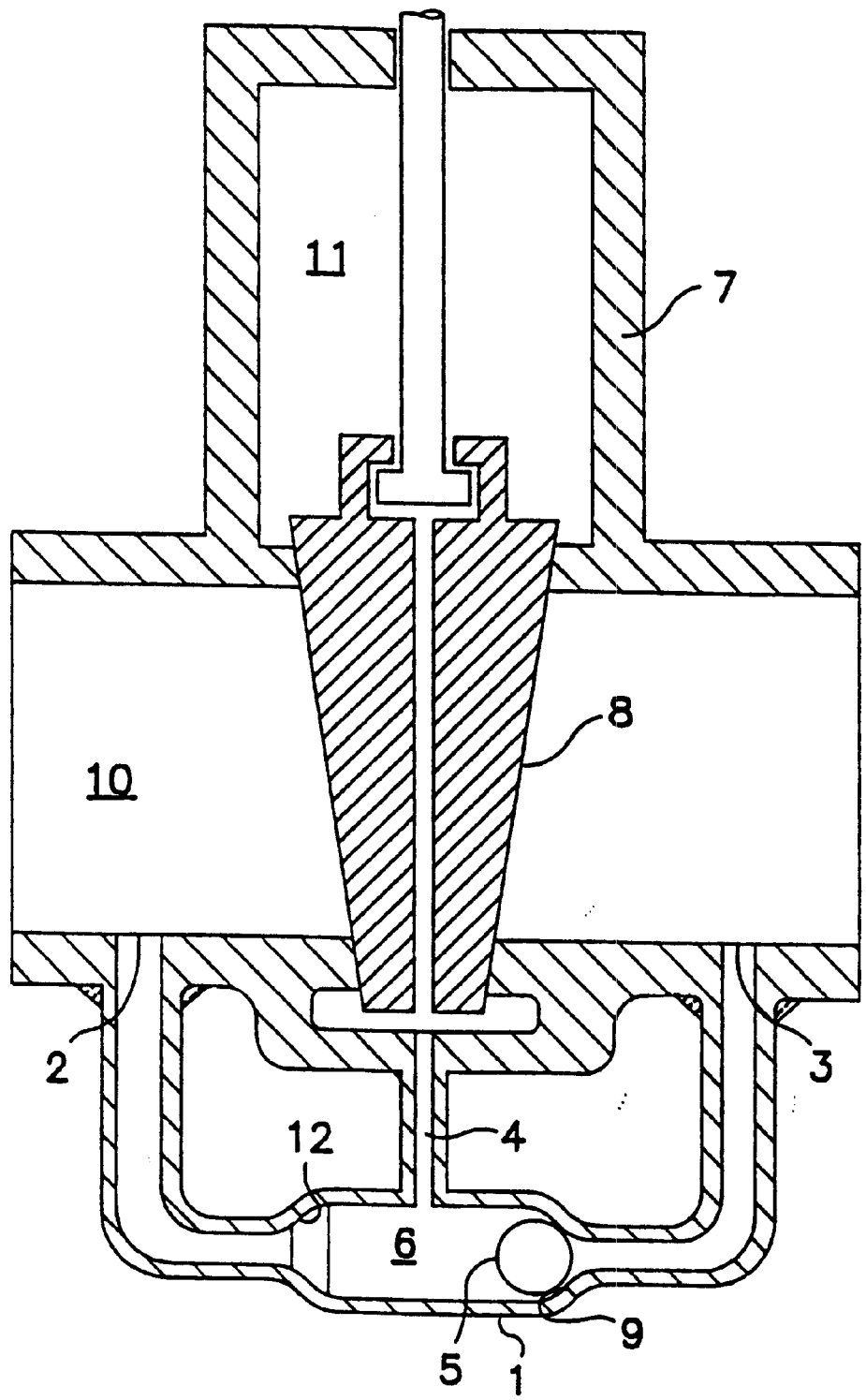
FIG. 1 is a sectional view of a prior art automatic center cavity equalizing valve.
Figure 2:
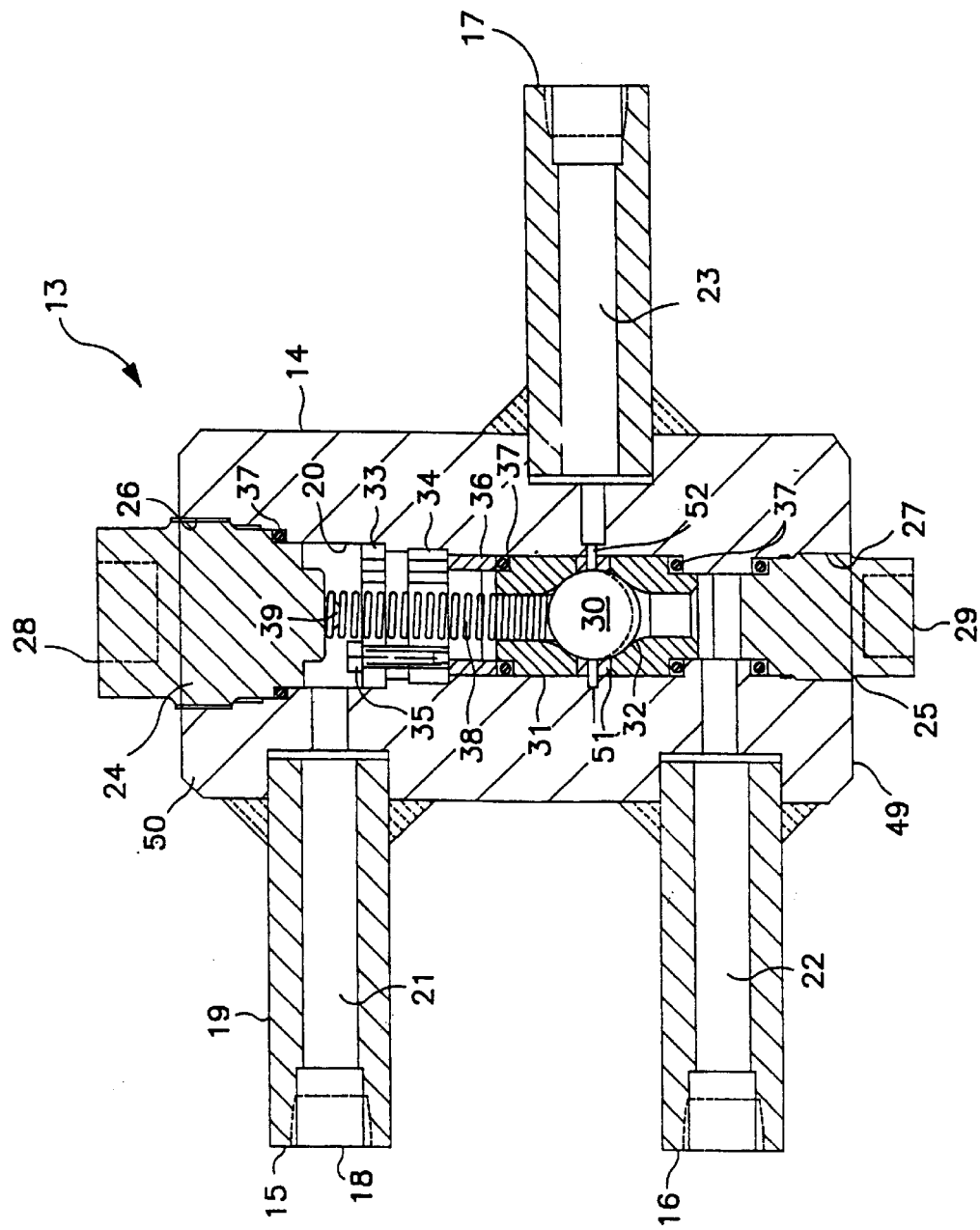
FIG. 2 is a sectional view of an automatic center cavity equalizing valve according to the present invention.

Referring to FIG. 2, it will be seen that an illustrative automatic center cavity equalizing valve 13 includes a body 14 with three ports; an upstream port 15, a downstream port 16, and a center cavity port 17. Each port preferably includes a flow passage 21,22,23 with an enlarged opening (e.g. at 18) with a threaded connection to permit testing before coupling of the equalizing valve to a main valve by welding as in FIG. 3. Obviously, however, the ports may be adapted to meet the size and requirements of the main valve system to which the equalizing valve is to be attached.

As shown in FIG. 2, the upstream 15 and downstream 16 ports are preferably on the same side of the equalizing valve with the center cavity port 17 formed between them. This arrangement, however, can be modified to suit a particular application. For example, with reference to FIG. 3, the upstream port 15 and downstream port 16 may be on opposite sides of the valve or in any other angular relationship to each other as long as the center cavity port 17 is arranged between them.

Turning again to FIG. 2, the body 14 is further provided with a bore 20 therein. The bore 20 is preferably transverse to the ports 15,16,17. Preferably, the flow passages 21,22,23 intersect the bore to provide for fluid communication between the ports and the bore.

Removable access plugs 24,25 are provided to close the ends of the bore 20. Preferably, the access plugs 24,25 are threaded with ACME threads to mate with an interior surface 26,27 of the bore and to allow for facile assembly and disassembly of the access plugs to the body 14. The ACME thread form is preferred due to a generous pitch diameter clearance and resistance to binding due to corrosion. In addition, the outer end 28,29 of each access plug is dimensioned to mate with a standard wrench or other implement (not shown) to facilitate assembly and disassembly of the equalizing valve.

Within the bore 20 a solid metal ball 30 is provided between two valve seats 31,32. The seats 31,32 are separated by a spacer sleeve 51 having a radial flow passage 52 to permit fluid communication with flow passage 23. In the preferred embodiment, the upstream seat 31 and the downstream seat 32 are fixed in position through the combination of a locking ring 33 secured to an annular seat retainer 34 through a screw 35. A spacer ring 36 is fixed against the seat retainer 34 to secure the upstream 31 and down stream 32 seats into position. Also, die formed flexible graphite gaskets 37 are used to seal the internal seat joints and the access plugs. The flexible graphite gaskets are not harmed by temperatures encountered in steam valves or by radiation levels normally experienced in nuclear plants and, therefore, assure proper operation under harsh conditions.

Advantageously, the metal ball 30 is spring biased against the downstream valve seat 32 by a compression spring 38. The compression spring 38 extends through the upstream valve seat 31, the spacer ring 36, the seat retainer 34 and the locking ring 33 to a projection 39 on the access plug 24. Biasing the ball 30 against the downstream seat 32 prevents the ball from rattling and damaging the valve seats during transitional periods in the valve.

Figure 3:
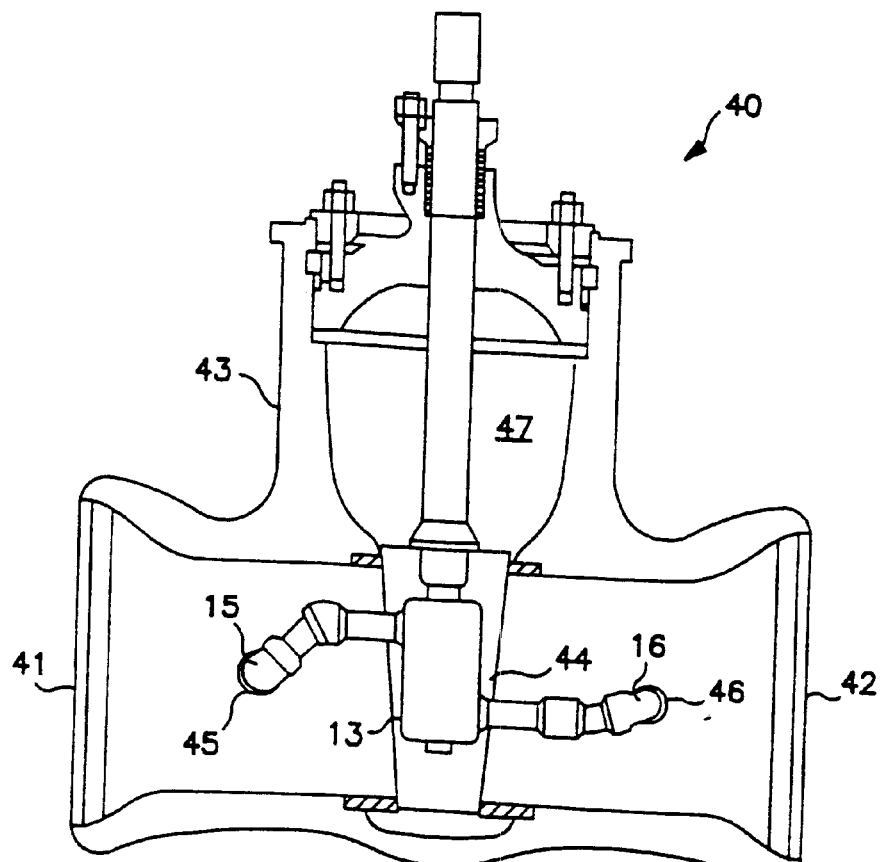
FIG. 3 is a side sectional view showing the automatic center cavity equalizing valve of FIG. 2 as configured to a main valve for preventing over pressurization of the center cavity of the main valve.
Figure 4:
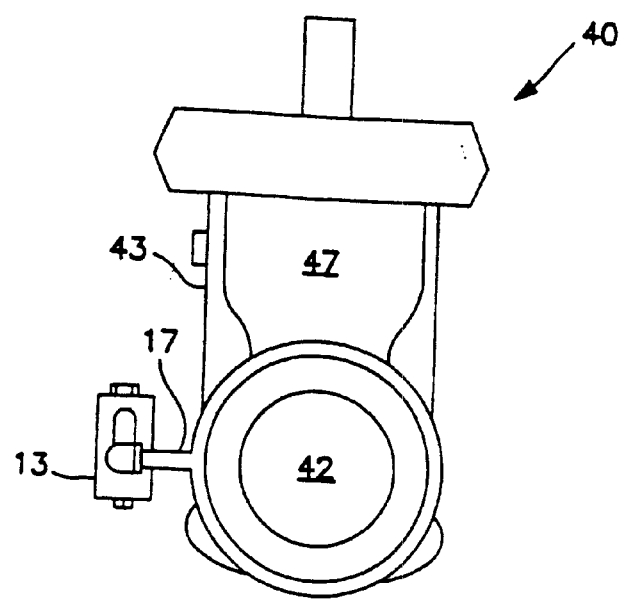
FIG. 4 is an end sectional view showing the connection of the center cavity port of the automatic center cavity equalizing valve to a main valve configured as shown in FIG. 3.

In operation, the automatic center cavity equalizing valve 13 of FIG. 2, is mounted to a main valve 40 as shown in FIGS. 3 and 4. Referring to FIG. 3, the main valve 40 has an inlet conduit 41 and an outlet conduit 42 for passage of a fluid (gas or liquid). The main valve body 43 extends transversely from the inlet and outlet conduits and has a double seated closure member 44 (FIG. 3) between the inlet and outlet conduits. Through appropriate connections, e.g. at 45 and 46, the upstream port 15 of the equalizing valve 13 is mounted in fluid communication with the inlet conduit 41 of the main valve 40, and the downstream port 16 of the equalizing valve 13 is mounted in fluid communication with the outlet conduit 42 of the main valve. At the same time, the center cavity port 17 (FIG. 4) of the equalizing valve 13 is fixed in fluid communication with the center cavity 47 of the main valve 40.

Referring also to FIG. 2, under normal conditions upstream pressure from the main valve inlet conduit 41 coacts with the biasing force provided by the spring 38 to force the ball 30 against the downstream seat 32. Thus, the ball seals the downstream port 16 from fluid passage to prevent leakage through the downstream port. At the same time, the ball allows fluid communication between the upstream port 15 and the center cavity port 17 to the center cavity 47 of the main valve through the fluid passage 21, the center of the lock ring 33, seat retainer 34, spacer 36, and over the ball 30. With this configuration, pressure in the center cavity 47 of the main valve 40 is maintained at the same level as the upstream pressure against the closure member 44 in the inlet conduit 41.

In the event that a reverse pressure is applied to the main valve 40, the ball 30 is forced against the upstream seat 31 to allow communication between the outlet conduit 42 and the center cavity 47 of the main valve 40 while sealing the inlet conduit 41 from reverse leakage. In this case, however, the reverse pressure must exceed the force provided by the compression spring 38 which biases the ball 30 against the downstream seat 32. This biasing force, however, is rather small so that only relatively low reverse pressure, e.g. 10 p.s.i., is required to overcome the spring and seal the ball against the upstream seat 31.

Referring particularly to FIG. 2, to provide for maintainability the bore opening at each end 49,50 of the equalizing valve 13 is sized differently so that different sized access plugs 24,25 are required to close each end of the bore. As shown in FIG. 2, for example, the bore opening and access plug 24 at end 50 are larger than the bore opening and access plug 25 at end 49. This construction forces proper assembly of the equalizing valve since the access plugs can only fit into the appropriately sized bore opening. To service or replace the interior components of the valve (e.g. the valve seats 31,32), the access plugs 24,25 are removed and a solid rod (not shown) is forced through the smaller bore opening (e.g at end 49) to drive the interior components out of the larger bore opening (e.g. at end 50). The interior components can then be repaired or replaced and installed back into the bore.

There is thus provided an automatic center cavity equalizing valve having therein a compression spring for biasing a ball member against a downstream seat to prevent rattling of the ball within the valve. In addition, the valve includes access plugs for facilitating ease of maintenance, and ACME threads and flexible graphite seals to ensure proper operation under harsh conditions.

It is to be understood that the present invention is by no means limited to the particular construction herein disclosed and/or shown in the drawings, but also comprises any modifications or equivalents within the scope of the claims.

Having thus described the invention, what is claimed is:

1. An automatic center cavity equalizing valve, comprising:
    a body having a bore therethrough and an upstream port, a downstream port, and a center cavity port, said bore providing fluid communication between said upstream port and said downstream port, and said downstream port and said center cavity port;
    a ball member disposed within said bore;
    a downstream seat for said ball member, said ball member being adapted to engage said downstream seat to thereby seal said downstream port from fluid communication with said center cavity port; and
    first and second access plugs for closing opposite ends of said bore, said first and second access plugs being removable to allow access to said bore for maintenance of said downstream seat, said first and second access plugs being positioned apart from and relative to said downstream, upstream and center cavity ports such that said first and second access plugs can be removed as said downstream, upstream and center cavity ports remain in fluid communication with respective upstream, downstream and center cavity flow lines of a second valve.

2. An automatic center cavity equalizing valve according to claim 1 wherein said first and second access plugs are threaded to removably mate with threads an interior surface of said bore.

3. An automatic center cavity equalizing valve according to claim 2, wherein said threads are ACME threads.

4. An automatic center cavity equalizing valve according to claim 1 wherein said first access plug is larger than said second access plug.

5. An automatic center cavity equalizing valve according to claim 1, said valve further comprising at least one flexible graphite gasket for sealing said first and second access plugs against said bore.

6. A dual valve combination, comprising:
    a first valve having an upstream port, a downstream port, and a center cavity; and
    a second center cavity equalizing valve, said second valve comprising:
        a body having a bore therethrough and an upstream port, a downstream port, and a center cavity port, said upstream port being in fluid communication with said inlet, said downstream port being in fluid communication with said outlet, and said center cavity port being in fluid communication with said center cavity, said bore providing fluid communication between said upstream port and said center cavity port, and said downstream port and said center cavity port;
        a ball member disposed within said bore;
        an upstream seat for said ball member, said ball member being configured to engage said upstream seat and seal said upstream seat from fluid communication with said center cavity port; and
        a downstream seat for said ball member, said ball member being configured to engage said downstream seat and seal said downstream port from fluid communication with said center cavity port; and
        a biasing member positioned within said bore, said biasing member providing a biasing force against said ball member in the direction of said downstream seat.

7. The dual valve combination defined in claim 6, wherein:
    said downstream seat and said ball member are configured such that said ball member disengages from said downstream seat when a force exerted on said ball member by a fluid in said downstream port exceeds said biasing force and a force exerted on said ball member by a fluid in said upstream port; and
    said ball member and said upstream seat are configured such that said ball member disengages from said upstream port when a force exerted on said ball member by a fluid in said downstream port is less than a force exerted on said ball member by a fluid in said upstream port and said biasing force.

8. A dual valve combination according to claim 6 further comprising at least one flexible graphite gasket for sealing said downstream seat against said bore.

9. A dual valve combination according to claim 6 further comprising first and second access plugs for closing opposite ends of said bore, said first and second access plugs being removable to allow access to said bore.

10. A dual valve combination according to claim 6, wherein said biasing member comprises a compression spring fixed between said first access plug and said ball member.

11. A dual valve combination according to claim 9, wherein said first and second access plugs are threaded to removably mate with threads on an interior surface of said bore.

12. A dual valve combination according to claim 9, wherein said first access plug is larger than said second access plug.

13. A dual valve combination according to claim 9, further comprising at least one flexible graphite gasket for sealing said first and second access plugs against said bore.

14. A dual valve combination, comprising:
   a first valve having an upstream port, a downstream port, and a center cavity; and
   a second center cavity equalizing valve, said second valve comprising:
      a body having a bore therethrough and an upstream port in fluid communication with said first valve upstream port, a downstream port in fluid communication with said first valve downstream port, and a center cavity port in fluid communication with said first valve center cavity, said bore providing fluid communication between said second valve upstream port and said second valve downstream port, and between said second valve downstream port and said center cavity port;
      a ball member disposed within said bore;
      a downstream seat for said ball member, said ball member being adapted to engage said downstream seat to thereby seal said downstream port from fluid communication with said center cavity port; and
      first and second access plugs for closing opposite ends of said bore, said first and second access plugs being removable to allow access to said bore for maintenance of said downstream seat, said first and second access plugs being positioned apart from and relative to said downstream, upstream and center cavity ports of said second valve such that said first and second access plugs can be removed as said downstream, upstream and center cavity ports of said second valve remain in fluid communication with, respectively, said upstream, said downstream port and said center cavity ports of said first valve.

15. A dual valve combination according to claim 14, wherein said first and second access plugs are threaded to removably mate with threads on an interior surface of said bore.

16. A dual valve combination according to claim 15, wherein said threads are ACME threads.

17. A dual valve combination according to claim 14, wherein said first access plug is larger than said second access plug.

18. A dual valve combination according to claim 14, further comprising at least one flexible graphite gasket for sealing said first and second access plugs against said bore.

19. A dual valve combination according to claim 14, wherein said bore defines a flow axis, and wherein said first and second access plugs are positioned on said flow axis.

20. An automatic center cavity equalizing valve according to claim 1, wherein said bore defines a flow axis, and wherein said first and second access plugs are positioned on said flow axis.

* * * * *